US006296922B1

(12) United States Patent
Nagel

(10) Patent No.: US 6,296,922 B1
(45) Date of Patent: Oct. 2, 2001

(54) ASSEMBLY HAVING A SYSTEM FOR PREVENTING MECHANICAL VIBRATIONS

(75) Inventor: Thomas Nagel, Engelskirchen (DE)

(73) Assignee: Emitec Gesellschaft fuer Emisionstechnologie mbH, Lohmar (DE)

( * ) Notice: Subject to any disclaimer, the term of this patent is extended or adjusted under 35 U.S.C. 154(b) by 0 days.

(21) Appl. No.: 09/443,750

(22) Filed: Nov. 19, 1999

Related U.S. Application Data

(63) Continuation of application No. PCT/EP98/02859, filed on May 14, 1998.

(30) Foreign Application Priority Data

May 20, 1997 (DE) .......................................... 297 08 861 U
Jul. 22, 1997 (DE) .............................................. 197 31 487

(51) Int. Cl.$^7$ ...................................................... B32B 3/12
(52) U.S. Cl. ........................................... 428/116; 428/118
(58) Field of Search ..................................... 428/116, 118

(56) References Cited

FOREIGN PATENT DOCUMENTS

359195403 * 11/1984 (JP) .

* cited by examiner

*Primary Examiner*—Francis J. Lorin
(74) *Attorney, Agent, or Firm*—Herbert L. Lerner; Laurence A. Greenberg; Werner H. Stemer

(57) ABSTRACT

An assembly having a system for preventing mechanical vibration includes a honeycomb body disposed in the interior of a tubular casing for permitting a fluid flow therethrough. The tubular casing has at least one reinforcing structure which locally increases vibration resistance and is connected to the honeycomb body only in at least one partial region of its inner surface at least in a surrounding region of the reinforcing structure only over a part of the inner periphery. The reinforcing structure projects from the outer surface of the tubular casing by more than the thickness of the tubular casing. The system according to the invention enhances both the durability of a honeycomb body as well as its connection to a tubular casing.

27 Claims, 2 Drawing Sheets

ASSEMBLY HAVING A SYSTEM FOR PREVENTING MECHANICAL VIBRATIONS

CROSS-REFERENCE TO RELATED APPLICATION:

This application is a continuation of copending International Application No. PCT/EP98/02859, filed May 14, 1998, which designated the United States.

BACKGROUND OF THE INVENTION

Field of the Invention

The invention relates to an assembly having a honeycomb body which is disposed in the interior of a tubular casing and through which a fluid can flow. The honeycomb body can function in particular as a carrier body for a catalytically active material which permits conversion of harmful components of exhaust gases of an internal combustion engine into harmless substances.

German Utility Model U 89 05 415.6 discloses a metal honeycomb body which serves as a catalyst carrier body and which is disposed in the interior of a tubular casing. The tubular casing has a peripherally extending outwardly flanged portion. It can be inserted into an opening in a wall, which is slightly larger than the outside dimensions of the tubular casing in the region which is not outwardly flanged, until the outwardly flanged portion bears against the edge of the opening. In that position the tubular casing can be connected to the wall by a procedure involving intimate joining of the materials involved so that the tubular casing is durably fixed in position.

German Published, Non-Prosecuted Patent Application DE 42 31 338 A1 discloses a brazing process in which an adhesive material and brazing powder adhering thereto are applied to the outer periphery of the honeycomb body for the purposes of brazing a metal honeycomb body to a tubular casing. By virtue of the adhesive material, the brazing powder continues to cling in position even during the subsequent steps in the process until the brazed join is definitively finished. The process permits the deliberate and specific soldering of partial regions to the outer periphery of a metal honeycomb body.

German Utility Model U 89 10 107.3 discloses a tubular casing for a metal honeycomb body which-has a plurality of external beads or corrugations. The external beads serve to stiffen the tubular casing so that, in comparison with tubular casings without stiffening elements, it is possible to save on materials by virtue of the wall thickness being reduced. The external beads or corrugations serve in particular to prevent the tubular casing from bulging out under load, for example due to gas pressure in the interior of the tubular casing.

European Patent 0 245 737 B1 describes a honeycomb body which is connected to a tubular casing by weld seams extending substantially in the peripheral direction of the tubular casing, in the interior of the tubular casing. By virtue of a suitable choice of welding parameters, it is possible to provide for the roots of the weld seams to sink somewhat inwardly so that in addition there is a form-locking connection between the tubular casing and the honeycomb body. It is generally known that weld seams can be weak locations in a metal structure, which have a tendency in particular toward brittle fracture. Care is therefore to be taken to ensure suitable positioning of weld joins and the choice of a suitable welding process.

German Published, Non-Prosecuted Patent Application DE 41 12 354 A1 discloses a honeycomb body which includes a plurality of layers of corrugated sheet metal layers or smooth and corrugated sheet metal layers and which is connected by welding to a tubular casing disposed around it. In order to facilitate the welding operation and in order to produce a durable connection between the tubular casing and the honeycomb body, the outer layer portion of the honeycomb body is formed from a plurality of mutually overlapping smooth end portions of the corrugated sheet metal layers or the corrugated and smooth sheet metal layers, wherein the end portions are of approximately equal length and are approximately uniformly distributed over the outer periphery of the honeycomb body. The tubular casing and the honeycomb body are welded together in the region of the axial ends of the tubular casing. In a particular configuration the honeycomb body and the tubular casing are reinforced at the ends by additional holding measures, for example a support ring.

Mechanical vibration in a tubular casing can occur due to different excitation mechanisms. For example, in the case of a tubular casing which is disposed in the exhaust system of an internal combustion engine and in the interior of which a honeycomb body acting as a catalyst carrier body is disposed, transverse vibrations of the tubular casing can occur due to vibration of the internal combustion engine, which is transmitted by way of other parts of the exhaust system. A connection between the tubular casing and the honeycomb body can be damaged or destroyed, particularly when resonance vibration is caused to occur in that respect.

A further possible cause of damage to or destruction of the connection is different thermally induced changes in the dimensions of the honeycomb body and the tubular casing. For that reason German Published, Non-Prosecuted Patent Application DE 195 07 299 A1, corresponding to U.S. application Ser. No. 08/921,817, filed Sep. 2, 1997, proposes making a connection between the honeycomb body and the tubular casing only in a partial region of the axial length of the tubular casing. Preferably, the connecting region is approximately at the center of the axial length of the tubular casing.

SUMMARY OF THE INVENTION

It is accordingly an object of the invention to provide a honeycomb body having a system for preventing mechanical vibrations, which overcomes the hereinafore-mentioned disadvantages of the heretofore-known devices of this general type, which is disposed in the interior of a tubular casing, through which a fluid can flow, which has a durably strong connection to the tubular casing and which further seeks to ensure that the honeycomb body itself is protected from damage.

With the foregoing and other objects in view there is provided, in accordance with the invention, an assembly having a system for preventing mechanical vibration, the assembly comprising a honeycomb body for conducting a fluid flow through the honeycomb body; and a tubular casing having a given thickness, an outer surface, an inner surface with partial regions, an inner periphery, an interior receiving the honeycomb body, at least one reinforcing structure locally increasing vibration resistance, and a surrounding region around the at least one reinforcing structure; the reinforcing structure projecting from the outer surface by more than the given thickness; and the tubular casing connected to the honeycomb body only in at least one of the partial regions at least in the surrounding region only over a part of the inner periphery.

The at least one partial region may also include the region under the reinforcing structure. There are thus one or more connections which are each disposed in a partial region in which at most small vibration amplitudes are to be expected by virtue of the proximity of that partial region to one or more reinforcing structures. In that way both the connections and also the honeycomb body itself are protected from excessive mechanical loadings. As a result, a greater degree of durability with respect to the honeycomb body and its connections to the tubular casing is to be expected and/or the connections can be of a less rugged nature. Bonding the honeycomb body to the tubular casing only in partial regions of the inner surface thereof in particular reduces the risk of the connection or connections between the honeycomb body and the tubular casing tearing away.

In particular the area at the outer periphery of the honeycomb body, at which there is a connection to the tubular casing, can be selected to be smaller than in the case of the previously known ways of making a connection to a tubular casing. This has inter alia two advantages: on one hand the expenditure involved in regard to production of the connection, for example the amount of material used, can be reduced. On the other hand it is possible to ensure that the connecting region lies completely in the proximity of a reinforcing structure.

In accordance with another feature of the invention, the honeycomb body has a plurality of sheet layers which extend along the through-flow path for the fluid. At least one of the sheet layers is connected to the tubular casing at the outer periphery of the honeycomb body by a procedure involving intimate joining of the materials involved, in such a way that in particular tensile forces can be carried thereby. The connection is preferably such that compression forces can also be carried, with the tensile and compression loadings which result from thermal effects occurring both in the axial and in the radial directions. The honeycomb body can be made up, for example, from structured and smooth sheet layers which fill the interior of the tubular casing in a spirally wound configuration, in a configuration being twisted in an S-shape one within the other or in an involute configuration. Many known honeycomb bodies with sheet layers, which, for example, are twisted in an S-shape, are elastic in directions transversely with respect to the through-flow path for the fluid. However, connections of the sheet layers to each other or to a tubular casing reduce the degree of elasticity. The fact that the connections of the honeycomb body to the tubular casing are in a region which involves a small amount of vibration means that the local reduction in elasticity has no effects or at most minor effects on durability. Preferably the connections of the sheet layers to each other are also disposed in the proximity of a reinforcing structure or in the same cross-sectional area as one or more reinforcing structures. In that way internal connections of the honeycomb body can also be protected from a mechanical loading.

In accordance with a further feature of the invention, at least a part of the sheet layers have a thickness of less than 50 $\mu$m, preferably about 30 $\mu$m. As is already known, such thin sheet layers mean that the period until the catalytic procedure involved in exhaust gas conversion begins in a cold start phase of an internal combustion engine can be kept particularly short. However, the sheet layers are particularly sensitive to a mechanical loading. The advantages of the system according to the invention for the prevention of mechanical vibrations are therefore particularly markedly relevant in that respect.

In accordance with an added feature of the invention, at least one sheet layer is connected to the tubular casing by way of the reinforcing structure which is in the form of a weld zone. The term weld zone is used to denote the zone in which there is material which has melted due to a welding operation and hardened again and which forms a joint between the sheet layer and the tubular casing, constituted by a blending of the materials involved. The weld zone can be in particular a weld seam or it can be of approximately spot-like nature. In a preferred embodiment the weld zone, besides the material of the sheet layer and tubular casing, has additional material in order to obtain a weld seam which is as strong as possible, or corresponding weld seam portions. The additional material can be added, for example, by melting away a metal electrode (metal-inert gas welding). The additional material provides the reinforcing effect to a substantial extent and thus the increase in vibration resistance of the tubular casing. It is, however, also possible to produce a reinforcing structure without additional material, for example by a procedure wherein the tubular casing is upset during the welding operation so that an accumulation of material occurs in the weld zone.

In accordance with an additional feature of the invention, the reinforcing structure is an external bead or corrugation on the tubular casing. The external bead is produced, for example, by a pressing tool prior to the honeycomb body being disposed in the tubular casing. In order not to excessively disturb the texture of the material of the tubular casing, the external corrugation is preferably of a kink-free nature. Alternatively or in addition to an external corrugation, the honeycomb body has a reinforcing structure in the form of an internal corrugation or bead. Preferably the honeycomb body is brazed or welded to the tubular casing at the internal corrugation and/or in the proximity thereof.

In accordance with yet another feature of the invention, the reinforcing structure extends around the honeycomb body in a helical configuration, with the reinforcing structure progressing substantially along the main through-flow direction of the fluid. In order to provide a particularly preferred reinforcing structure the tubular casing together with the honeycomb body disposed therein is rotated about the main through-flow direction while a weld seam is drawn at least in a portion-wise manner, with the addition of material, in a parallel relationship to the main through-flow direction, to join the honeycomb body to the tubular casing. Any desired pitch for the helical weld seam can be adopted by suitably matching the speed of rotation and the linear speed. In particular a weld seam may also have a varying pitch. For reasons of stability it is desirable in many embodiments for the turns of the weld seam to be denser approximately in the middle between the ends of the tubular casing, than in the proximity of the ends. It is preferred if the reinforcing structure passes around the honeycomb body at least twice. The connection between the tubular casing and the honeycomb body is formed in a portion-wise manner in relation to the inner periphery.

A helical connection between the tubular casing and a honeycomb body having a plurality of sheet layers which extend along the through-flow direction for the fluid is stable on one hand while on the other hand it results in an elastic bonding effect for the honeycomb body in directions which are transverse with respect to the main through-flow direction. That is because at no location in relation to the longitudinal axis are there regions which are connected to the inner surface of the tubular casing in substantially 180° mutually opposite relationship at the outer periphery of the honeycomb body. When force is applied to a connecting location between the tubular casing and the honeycomb body the honeycomb body can thus locally deflect, involving slight reversible torsional movements and/or movements in parallel relationship to the main through-flow direction, whereby destruction of a connection once made is very substantially avoided. The helical connection has a portion-wise nature.

In accordance with yet a further feature of the invention, the reinforcing structure extends in a ring-like configuration which is closed in itself around the honeycomb body. Reinforcing structures of that nature are particularly strong and therefore have a particularly high level of vibration resistance. Preferably in that case the connection between the honeycomb body and the tubular casing is in the form of ring portions.

In accordance with yet an added feature of the invention, the tubular casing is connected to the honeycomb body in the respective partial region over at most one third and preferably one sixth to one quarter of its inner periphery. That ensures that adequate different degrees of expansion caused by the effect of heat are made possible in the other non-connected region as between the tubular casing and the honeycomb body. Thus the longitudinal portion in which the tubular casing is connected to the honeycomb body is spaced from the axial ends of the tubular casing.

In accordance with yet an additional feature of the invention, the longitudinal portion in which the tubular casing is connected to the honeycomb body extends substantially over the entire length of the tubular casing.

In accordance with again another feature of the invention, the honeycomb body has such a structure that a plurality of at least partially structured sheet layers which form the walls of a plurality of passages through which the fluid can flow are connected together, preferably by brazing, only in partial zones.

In accordance with again a further feature of the invention, the fluid can flow substantially parallel to a longitudinal axis in the honeycomb body, and the reinforcing structure or one of the reinforcing structures is disposed approximately in the middle of the axial length of the tubular casing. This configuration provides for an increase in vibration resistance for the entire tubular casing since the portions of the tubular casing which are susceptible with regard to transverse vibration are shortened in an optimum manner.

In accordance with again an added feature of the invention, having a honeycomb body through which the fluid can flow substantially parallel to a longitudinal axis, the tubular casing has a plurality of reinforcing structures which each extend substantially in the peripheral direction and divide the tubular casing into portions of approximately equal length. This development also provides that the lengths of continuous regions which are susceptible to vibration are reduced in the optimum manner.

In accordance with again a further feature of the invention, the tubular casing is connected to the honeycomb body in the respective partial regions in such a way that at no location in any plane perpendicular to the longitudinal axis are there connecting regions which are disposed in substantially 180° mutually opposite relationship with respect to the longitudinal axis. This means that, if at a location on the inner surface of the tubular casing the honeycomb body is connected to the tubular casing in one or more individual respective partial regions, then there is no further partial region having a connection between the tubular casing and the honeycomb body, in a notional plane perpendicular to the longitudinal axis or the through-flow direction of the honeycomb body and through the partial region or regions, substantially in 180° mutually opposite relationship thereto. Therefore certain connecting regions do not have connecting regions disposed in opposite relationship thereto, but those oppositely disposed connecting regions are disposed in a plane which, in relation to the longitudinal axis of the honeycomb body, is a defined length or a defined spacing away from the plane in which the first-considered connecting regions or partial regions are disposed.

In accordance with again an added feature of the invention, the partial region or each partial region is disposed asymmetrically with respect to the longitudinal axis. It is also possible for a plurality of partial regions of the inner surface of the tubular casing to be connected to the honeycomb body, as long as they are disposed asymmetrically. The term asymmetric configuration is used to indicate that at no location in any plane perpendicularly to the longitudinal axis are there connecting regions which are disposed in substantially 180° mutually opposite relationship with respect to the longitudinal axis. In relation to the inner periphery of the inner surface of the tubular casing that means that the connecting region is smaller than 180°, wherein the connecting region is in the form of an individual connecting region and extends over that peripheral angular region <180° or in a plurality of separate connecting portions thereover. As long as the angle over which the connecting region extends in the respective partial region at the inner periphery of the tubular casing is less than 180°, no connecting region which also has a connecting region in 180° mutually oppositely disposed relationship thereto exists in any defined plane perpendicularly to the longitudinal axis. This asymmetric configuration of the partial region in which the connection is made between the tubular casing and the honeycomb body provides that on one hand a sufficient degree of connecting strength is afforded as between the tubular casing and the honeycomb body as long as that connection is disposed substantially at the locations at which otherwise the greatest vibration amplitudes occur, while on the other hand the catalyst carrier body also enjoys a sufficiently high degree of flexibility to be able to carry thermal loadings, in particular as a result of temperature differences.

In accordance with again an additional feature of the invention, the tubular casing is connected to the honeycomb body in the partial region in such a way that, in relation to the longitudinal axis, there exist mutually oppositely disposed connecting regions which are disposed in different planes that are perpendicular to the longitudinal axis. It is thus possible for those connecting regions to be disposed in opposite relationships substantially at 180°, with respect to the periphery of the inner surface of the tubular casing, without lying in the notional planes which are disposed perpendicularly to the longitudinal axis.

In accordance with a concomitant feature of the invention, the honeycomb body is connected to the tubular casing only in a partial region which substantially extends therearound substantially coaxially with respect to the longitudinal axis of the honeycomb body in a helical configuration on the inner surface of the tubular casing with a pitch. Accordingly the connecting region which is disposed in the partial region extends in a helical configuration around the inner surface of the tubular casing, wherein the connecting regions are disposed in a portion-wise manner on the helically extending partial region. Depending on the respective pitch of that helically extending partial region such a partial region extends either once or a plurality of times or only in part around the inner surface of the tubular casing. In that respect that partial region can begin both at the axial ends of the catalyst carrier body and it can also extend around the honeycomb body only in the central region of the catalyst carrier body.

Other features which are considered as characteristic for the invention are set forth in the appended claims.

Although the invention is illustrated and described herein as embodied in an assembly having a system for preventing mechanical vibrations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
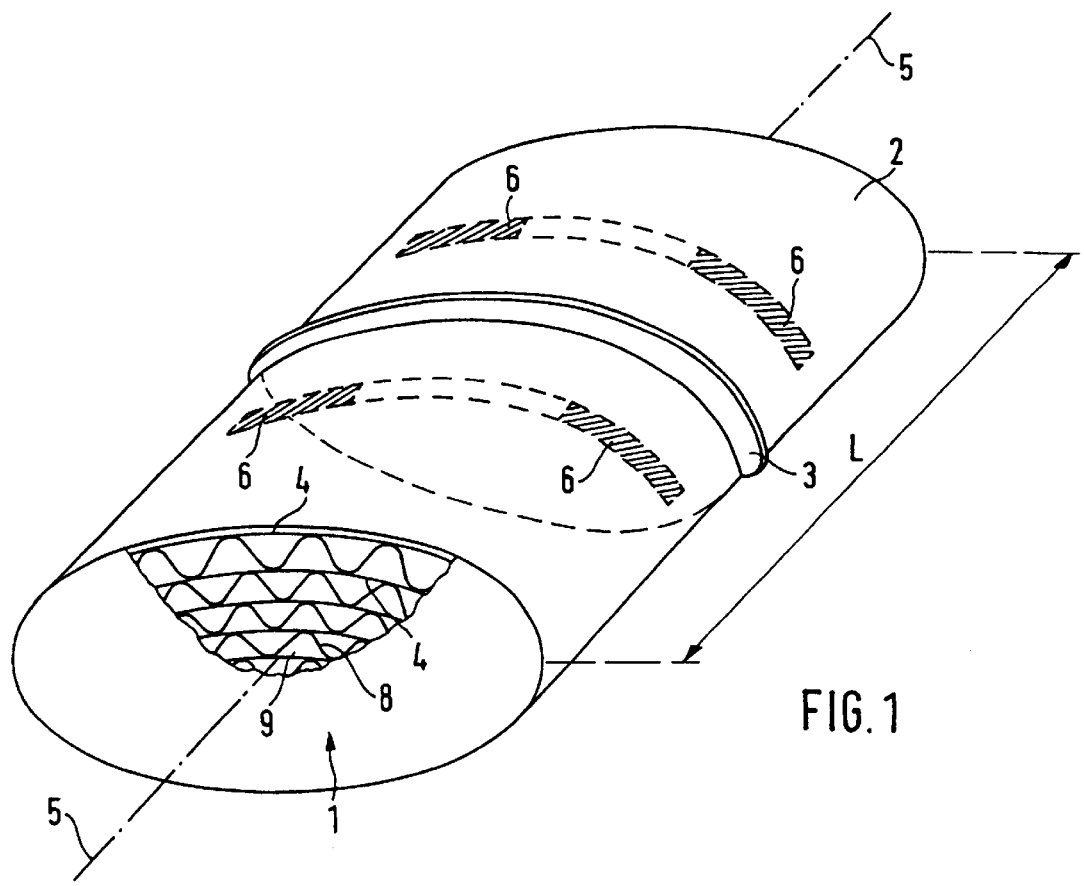
FIG. 1 is a diagrammatic, partly broken-away, perspective view of a honeycomb body in the interior of a tubular casing with three peripherally extending external corrugations.

Referring now to the figures of the drawings in detail and first, particularly, to FIG. 1 thereof, there is seen a metal honeycomb body 1 which is disposed in the interior of a tubular casing 2. The honeycomb body 1 has a plurality of passages 9 which are formed by respective smooth and corrugated sheet layers 4 and 8 and through which a fluid can flow substantially parallel to a longitudinal axis 5. The tubular casing 2 has a substantially elliptical configuration, as seen in cross-section. Further non-illustrated tubular casings which are suitable for carrying out the invention may have any desired cross-sectional shapes, for example oval.

The tubular casing 2 has a total of three reinforcing structures in the form of external corrugations or beads 3 which extend around the tubular casing in a ring-like configuration and are closed in themselves. The reinforcing structure 3 projects from the outer surface of the tubular casing 2 by more than the thickness of the tubular casing 2. The external corrugations 3 are disposed in substantially mutually parallel relationship and divide the tubular casing 2 into four portions of approximately equal length. The portions are therefore each approximately a quarter of a length L of the tubular casing 2.

The honeycomb body 1 and the tubular casing 2 are brazed together in four partial regions 6 of an inner periphery of the tubular casing 2. The partial regions 6 each extend in the peripheral direction along edges of two of the three external corrugations 3, over only a part of the inner periphery. The partial regions 6 are disposed completely in a surrounding area around the respectively adjacent external corrugation 3. Each partial region extends approximately over a third of the inner periphery and is between 1 and 2 cm in width.

Honeycomb bodies with smooth and corrugated sheet layers 4, 8 which are twisted in an S-shape one within the other and honeycomb bodies with sheet layers 4, 8 which extend in an involute configuration in cross-section may also, in particular, be secured to a tubular casing in a corresponding manner, instead of the illustrated honeycomb body 1.

Figure 2:
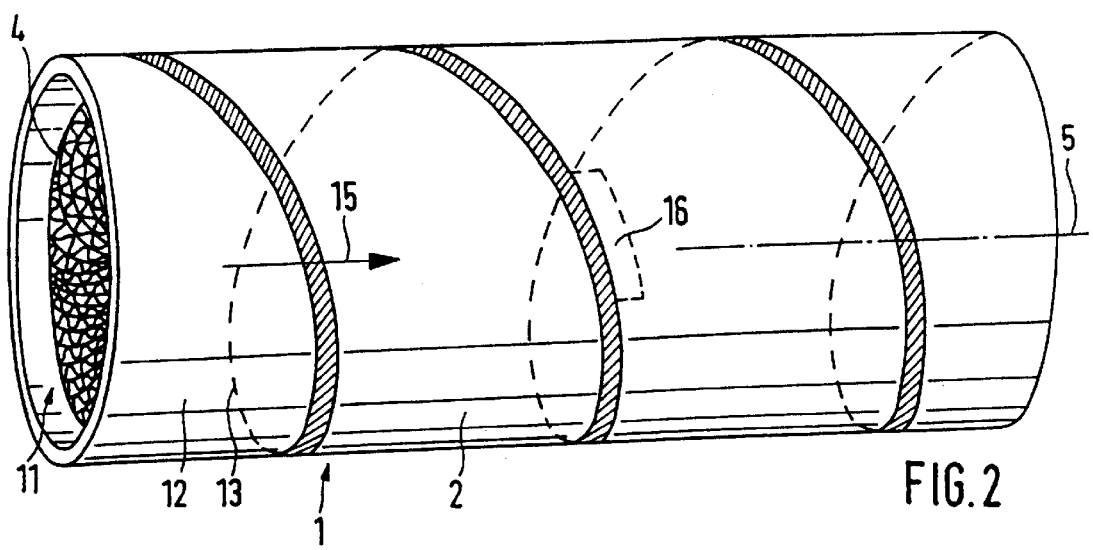
FIG. 2 is a perspective view of a honeycomb body fixed by a helically extending weld seam in the interior of the tubular casing.

In the embodiment of the invention shown in FIG. 2 a metal honeycomb body 11 and a tubular casing 12 which has a circular cross-section are connected together by way of a reinforcing structure which extends therearound in a helical configuration and which is in the form of a weld seam 13. The reinforcing structure 13 projects from the outer surface of the tubular casing 12 by more than the thickness of the tubular casing 12. The weld seam 13 is a weld seam which is produced with the addition of material using a metal-inert gas welding process and which penetrates through a wall of the tubular casing 12. It can be seen from FIG. 2 that the weld seam 13 has an outward bulge configuration at an outer periphery of the tubular casing 12 over the entire extent thereof. The outward bulge configuration is solid and provides for reinforcement of the tubular casing 12 which results in an increased level of vibration-resistant strength in the region of the weld seam 13. The inner surface of the tubular casing 12 has partial regions 16 where the tubular casing 12 and the honeycomb body 11 are brazed.

Figure 3:
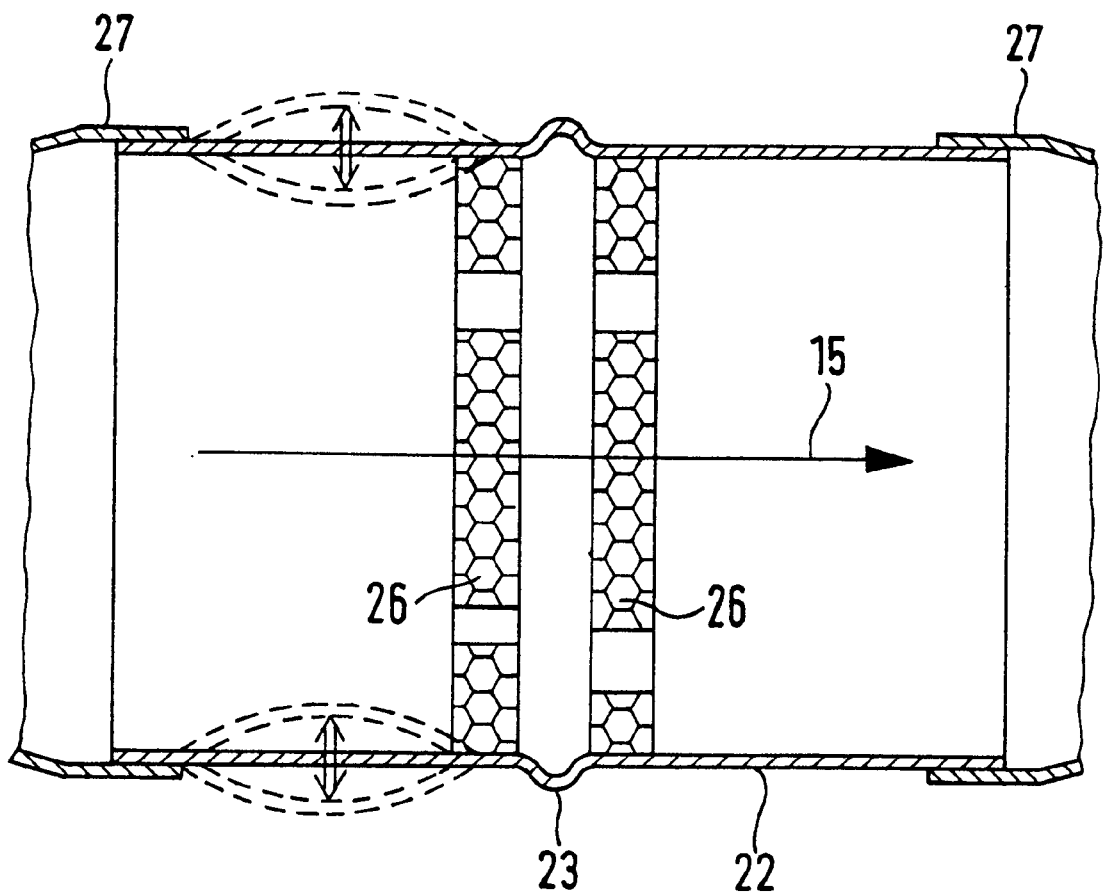
FIG. 3 is a sectional view of a honeycomb body in a tubular casing with an external corrugation extending centrally therearound.

Reference will now be made to the diagrammatic view of FIG. 3 in order to describe, by way of example, a possible manner in which transverse vibrations of a tubular casing are provoked. A tubular casing 22 has an external corrugation 23 at its center which extends around the tubular casing in a closed configuration. The reinforcing structure 23 projects from the outer surface of the tubular casing 22 by more than the thickness of the tubular casing 22. A honeycomb body is brazed to the tubular casing 22 at edges of the external corrugation 23 in two partial regions 26 of an inner periphery of the tubular casing 22. The partial regions 26 are constructed in portions or sections. The tubular casing 22 is connected at each of its ends to a respective connecting pipe portion 27. One of the connecting pipe portions 27 leads to an exhaust gas outlet of a non-illustrated internal combustion engine. Vibration of the internal combustion engine is transmitted to the tubular casing 22 by way of the connecting pipe portion 27. The tubular casing 22 is excited to a condition of resonant vibration at certain values with respect to the speed of rotation of the internal combustion engine. The resonant vibration is indicated in the left-hand half of the figure at the top and bottom by a respective double-headed arrow. In that situation, mutually oppositely disposed regions of the tubular casing 22 move in opposite directions. By virtue of the presence of the external corrugation 23, only the partial region of the tubular casing between the external corrugation 23 and the connecting pipe portion 27 experiences vibration. The amplitude of the vibrations is shown on a magnified scale so that the vibration can be more clearly seen. It will be appreciated that, even with the illustrated magnitude of the vibration amplitudes, the part of the tubular casing 22 at the left-hand partial region 26 is not substantially affected by the vibration. In any event, the width of the partial regions 26, which is measured parallel to a main through-flow direction 15, is to be adapted to the vibration effects to be expected and thus to the length of the vibratable part of the tubular casing 22. If a further reinforcing structure were to be disposed in the vibratable part of the tubular casing, the left-hand partial region 26 could be wider than that shown in FIG. 3, because of the smaller magnitude of the vibration amplitudes to be expected.

The system according to the invention for the prevention of mechanical vibration results in a durably rugged connection between a honeycomb body and a tubular casing, in the interior of which the honeycomb body is disposed, as well as a reduction in mechanical loadings on the honeycomb body.

I claim:

1. An assembly having a system for preventing mechanical vibration, the assembly comprising:
   a honeycomb body for conducting a fluid flow through said honeycomb body; and
   a tubular casing having a given thickness, an outer surface, an inner surface with partial regions, an inner periphery, an interior receiving said honeycomb body, at least one reinforcing structure locally increasing vibration resistance, and a surrounding region around said at least one reinforcing structure;
   said reinforcing structure projecting from said outer surface by more than said given thickness; and
   said tubular casing connected to said honeycomb body only in at least one of said partial regions at least in said surrounding region only over a part of said inner periphery.

2. The assembly according to claim 1, wherein said honeycomb body conducts the fluid flow along a through-flow path, said honeycomb body has an outer periphery, said honeycomb body has a plurality of sheet layers extending substantially along said through-flow path, and at least one of said sheet layers has a connection to said tubular casing at said outer periphery of said honeycomb body, said connection to be loaded at least with respect to tensile force.

3. The assembly according to claim 2, wherein at least a part of said sheet layers has a thickness of less than 50 $\mu$m.

4. The assembly according to claim 2, wherein at least a part of said sheet layers has a thickness of about 30 $\mu$m.

5. The assembly according to claim 2, wherein said reinforcing structure is a weld zone connecting at least one of said sheet layers to said tubular casing.

6. The assembly according to claim 5, wherein said weld zone has additional material besides material of said at least one sheet layer and said tubular casing.

7. The assembly according to claim 1, wherein said reinforcing structure is an external corrugation of said tubular casing.

8. The assembly according to claim 1, wherein said honeycomb body conducts the fluid flow along a main through-flow direction, said reinforcing structure extends helically around said honeycomb body, and said reinforcing structure progresses approximately along said main through-flow direction.

9. The assembly according to claim 8, wherein said reinforcing structure extends at least twice around said honeycomb body.

10. The assembly according to claim 8, wherein said at least one partial region has helical portions.

11. The assembly according to claim 1, wherein said reinforcing structure extends in a self-enclosed ring-like configuration around said honeycomb body.

12. The assembly according to claim 11, wherein said at least one partial region has ring portions.

13. The assembly according to claim 1, wherein said tubular casing is connected to said honeycomb body in said respective partial regions over at most one third of said inner periphery.

14. The assembly according to claim 1, wherein said tubular casing is connected to said honeycomb body in said respective partial regions over one sixth to one quarter of said inner periphery.

15. The assembly according to claim 13, wherein said tubular casing has axial ends, and said at least one partial region is spaced from said axial ends.

16. The assembly according to claim 13, wherein said tubular casing has a given length, and said at least one partial region extends substantially entirely over said given length.

17. The assembly according to claim 1, wherein said honeycomb body has a plurality of at least partially structured sheet layers forming walls of a plurality of passages through which the fluid can flow, and said sheet layers are brazed together only in partial zones.

18. The assembly according to claim 1, wherein said honeycomb body has a longitudinal axis, the fluid flow is substantially parallel to said longitudinal axis, said tubular casing has an axial length with a center, and said at least one reinforcing structure is disposed approximately at said center of said axial length.

19. The assembly according to claim 1, wherein said honeycomb body has a longitudinal axis, the fluid flow is substantially parallel to said longitudinal axis, and said at least one reinforcing structure is a plurality of reinforcing structures extending substantially in a peripheral direction and dividing said tubular casing into portions of approximately equal length.

20. The assembly according to claim 18, wherein said tubular casing is connected to said honeycomb body in said respective partial regions for avoiding connecting regions in substantially 180° mutually oppositely disposed relationship with respect to said longitudinal axis at all locations in any plane perpendicular to said longitudinal axis.

21. The assembly according to claim 19, wherein said tubular casing is connected to said honeycomb body in said respective partial regions for avoiding connecting regions in substantially 180° mutually oppositely disposed relationship with respect to said longitudinal axis at all locations in any plane perpendicular to said longitudinal axis.

22. The assembly according to claim 18, wherein said at least one partial region is disposed asymmetrically with respect to said longitudinal axis.

23. The assembly according to claim 19, wherein said at least one partial region is disposed asymmetrically with respect to said longitudinal axis.

24. The assembly according to claim 18, wherein said tubular casing is connected to said honeycomb body in said at least one partial region for locating connecting regions in mutually oppositely disposed relationship with respect to said longitudinal axis in different planes perpendicular to said longitudinal axis.

25. The assembly according to claim 19, wherein said tubular casing is connected to said honeycomb body in said at least one partial region for locating connecting regions in mutually oppositely disposed relationship with respect to said longitudinal axis in different planes perpendicular to said longitudinal axis.

26. The assembly according to claim 18, wherein said tubular casing is connected to said honeycomb body at said inner surface only in a partial region substantially extending around said honeycomb body substantially coaxially with respect to said longitudinal axis of said honeycomb body in a helical configuration at said inner surface with a pitch.

27. The assembly according to claim 19, wherein said tubular casing is connected to said honeycomb body at said inner surface only in a partial region substantially extending around said honeycomb body substantially coaxially with respect to said longitudinal axis of said honeycomb body in a helical configuration at said inner surface with a pitch.

* * * * *